July 25, 1967    J. F. STEEL    3,333,094
MEANS FOR REMOVING GLARE OF A LIGHT BEAM
Filed Dec. 14, 1964    4 Sheets-Sheet 1

INVENTOR.
JOHN F. STEEL
BY Fulwider, Patton, Rieber
Lee, and Utecht
ATTORNEYS

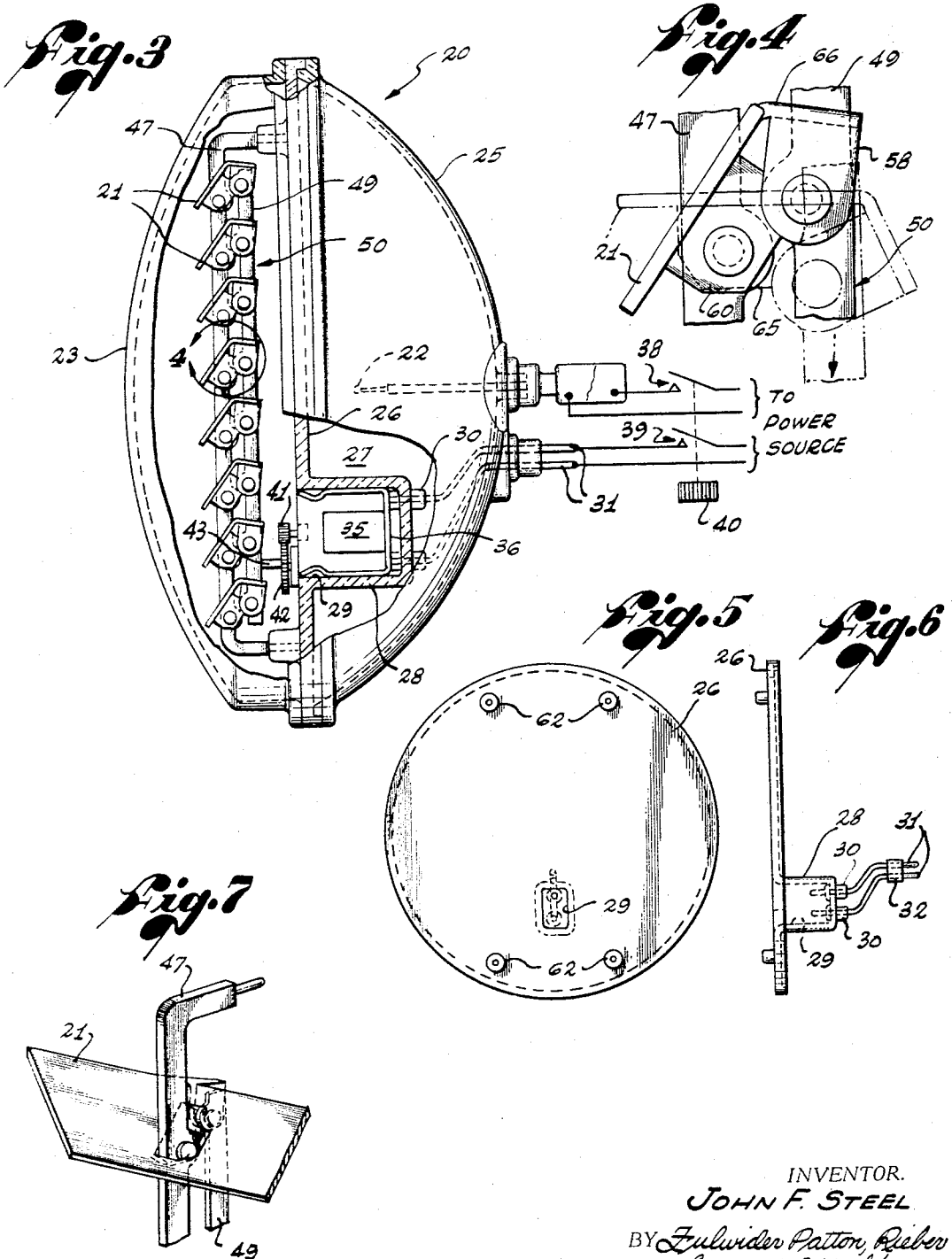

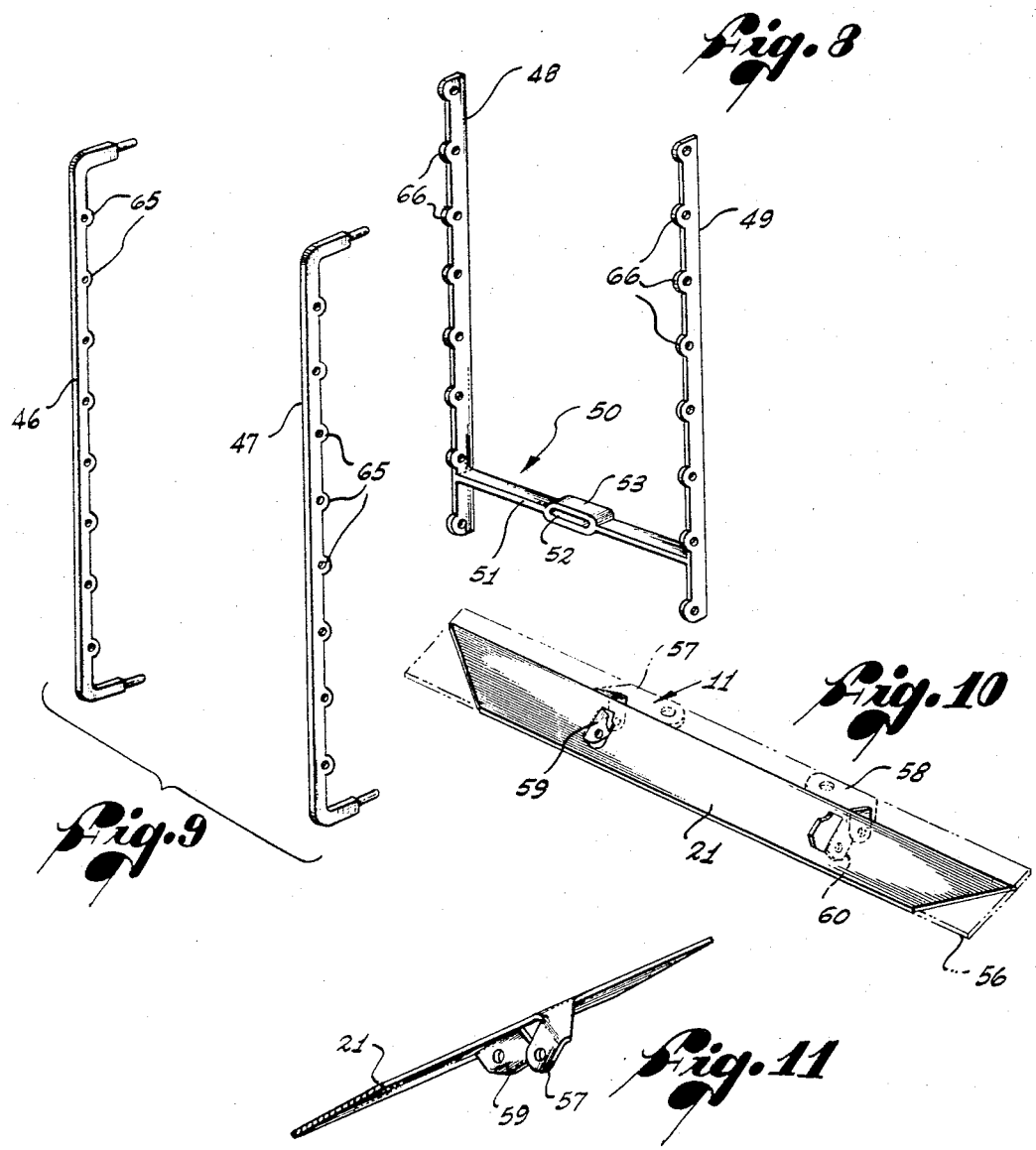

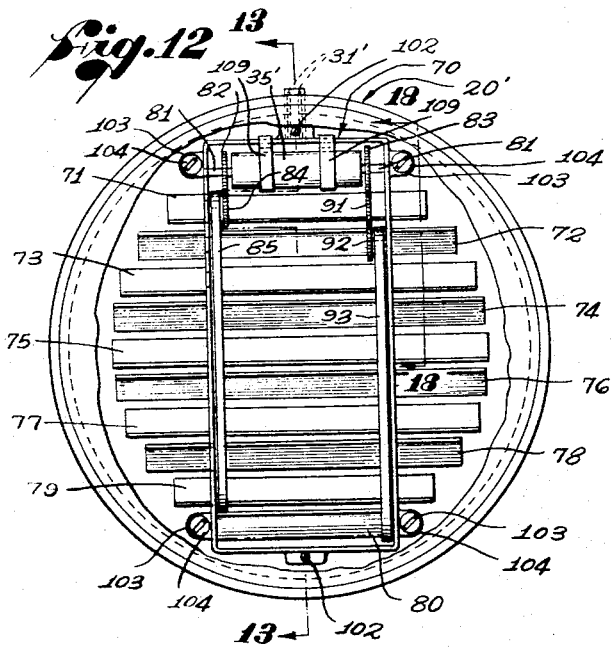
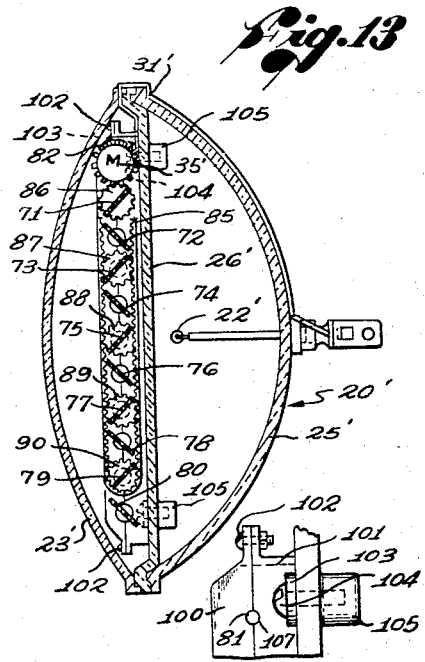
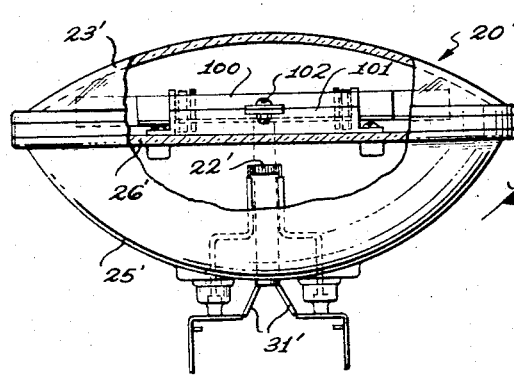
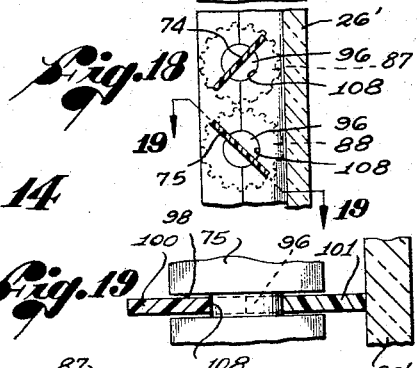
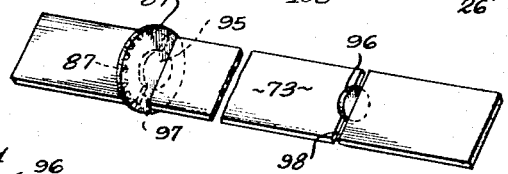
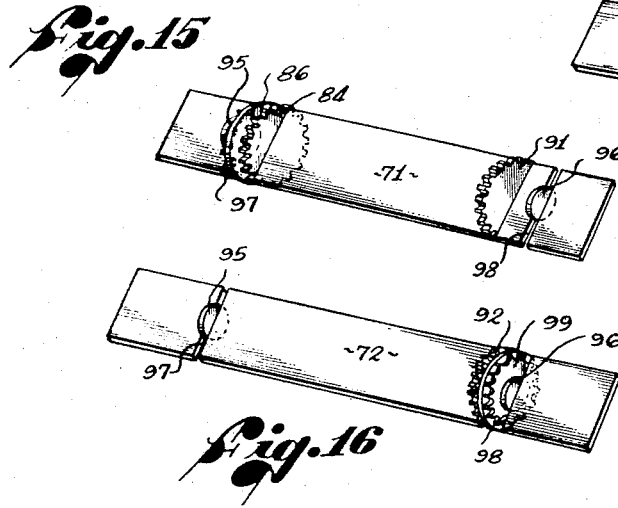

United States Patent Office 3,333,094
Patented July 25, 1967

3,333,094
MEANS FOR REMOVING GLARE OF A LIGHT BEAM
John F. Steel, 1469 N. Ocean Blvd., Palm Beach, Fla. 33480
Filed Dec. 14, 1964, Ser. No. 421,742
8 Claims. (Cl. 240—46.11)

This application is a continuation-in-part of my application Ser. No. 406,973, filed Oct. 26, 1964, and now abandoned, for Automobile Headlamp.

This invention relates to beam-type lighting devices, and more particularly to a unique apparatus and method for reducing glare of a light beam, as in automobile headlamps and the like.

As is well known, a person facing a strong light beam often is momentarily blinded by its glare. In the case of automobile headlamps, for example, one of the most dangerous obstacles to night driving is the glare of the headlamps of oncoming cars. All too often, a driver proceeds with his headlamps on "high beam" along unlighted stretches of roadways, and fails to dim his lights when he approaches cars coming in the opposite direction. All too often, too, the driver of the car coming from the opposite direction is blinded by the glare from the "high beam" lights, and is caused to lose control of his car and have an accident.

Also, while driving on highways at night where there is a considerable flow of traffic, the driver is often compelled to drive continuously on "low beam" with consequent poor lighting and little or no warning of poor or unlighted objects which he is approaching. Many accidents occur because such a driver travels at too high a speed while on "low beam" to permit him to avoid collision with an object after it is within the range of the beam and he is aware of it.

Another common problem with nighttime driving is that conditions are often such that a driver must frequently manipulate the foot switch for the headlamps and switch them back and forth between "high" and "low" beam operation. It is well known that frequent surges of current through a filament both in turning a light on and in turning it off, constitute a major factor in reducing the life of the filament and its lamp. Accordingly, it often happens that a filament, such as the "high" beam filament, burns out while driving, under circumstances in which the driver is forced to travel a considerable distance without the benefit of "high" beam operation where it is dangerous to be without the benefit of that light source.

It is also known that persons working under strong light beams, e.g., as in movie studios, or on outside construction jobs at night, are often temporarily blinded by the lights and unable to carry on their work.

It is an object of my invention to provide a unique apparatus and method eliminating objectionable glare of a light beam.

It is another object of my invention to effect operation of an automobile headlamp on "high beam" only without objectionable glare, and to permit elimination of "low beam" lights and switching circuits heretofore used.

It is another object of my invention to provide a unique lamp construction with built-in means for rhythmically interrupting the beam and thereby reducing the total emitted light power to a level such that objectionable glare from the lamp is avoided without altering the light pattern or distance of the beam.

A further object of my invention is to provide a unique lamp construction having a built-in light interrupting mechanism which is composed of a minimum number of component parts of a simple design and rugged construction, capable of reliable operating over a long operating life.

The above and other objects of my invention will become apparent from the following description taken in conjunction with the accompanying drawings of an illustrative embodiment thereof, in which:

FIGURE 3 is a side elevation view of the lamp of my invention, partly broken away to show more clearly the relative positions of the support bars and the pulsating frame, and showing the manner in which the electric motor is supported in the mounting plate that separates the two compartments;

FIGURE 4 is an enlarged side elevation view taken of the area designated at 4 of FIGURE 3;

FIGURE 5 is a front elevation view of the mounting plate;

FIGURE 6 is a side elevation view of the mounting plate, showing more clearly the electrical connections to the motor well;

FIGURE 7 is an enlarged perspective view of a portion of one end of a louver, showing the tabs on the louver riveted to the support bar and pulsating frame;

FIGURE 8 is a perspective view of the pulsating frame;

FIGURE 9 is a perspective view of the two louver support bars;

FIGURES 10 and 11 are enlarged perspective views of a louver showing the tabs struck therefrom;

FIGURE 12 is a front elevation view of a lamp of my invention in which the louvers are rotatable;

FIGURE 13 is a sectional view taken along the line 13—13 of FIGURE 12;

FIGURE 14 is a bottom plan view of the lamp of FIGURE 12, partially broken away to show the interior thereof;

FIGURES 15–17 are perspective views of exemplary louvers employed in the lamp of FIGURE 12;

FIGURE 18 is a fragmentary sectional view taken along the line 18—18 of FIGURE 12; and FIGURE 19 is a sectional view taken along the line 19—19 of FIGURE 18.

Figure 1:
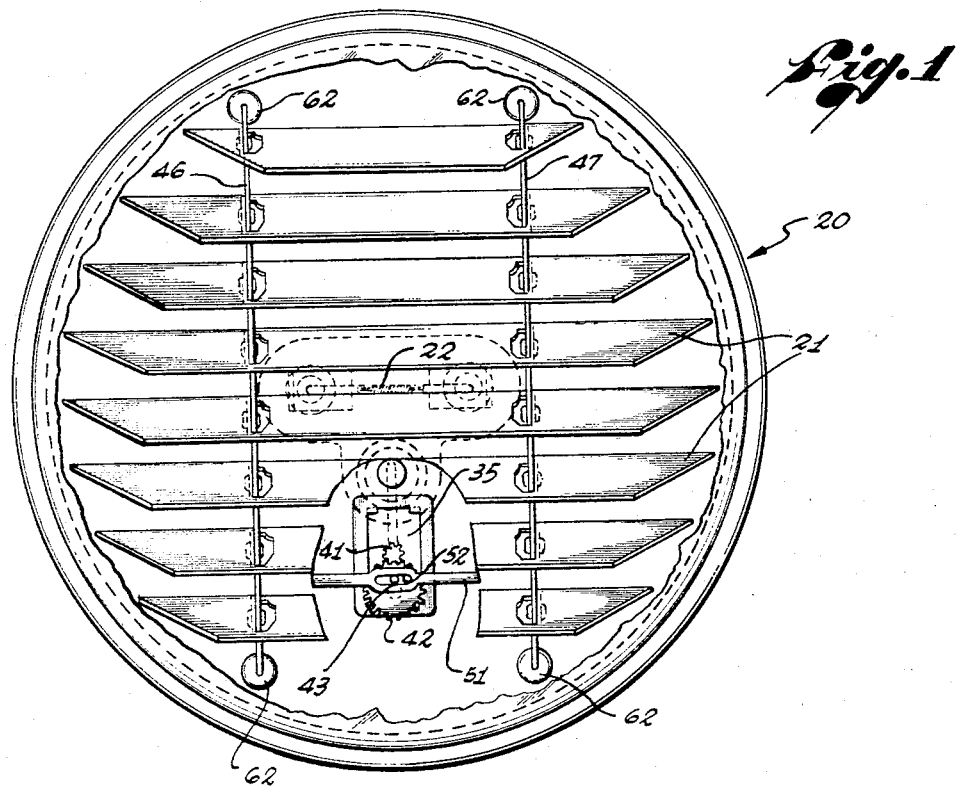
FIGURE 1 is a front elevation view of a lamp construction in accordance with my invention, showing the arrangement of a plurality of louvers adapted for movement between a partially closed position and a fully open position, partly broken away to show the arrangement by which the output shaft of a motor effects vertical movement of a pulsating frame for operating the louvers.
Figure 2:
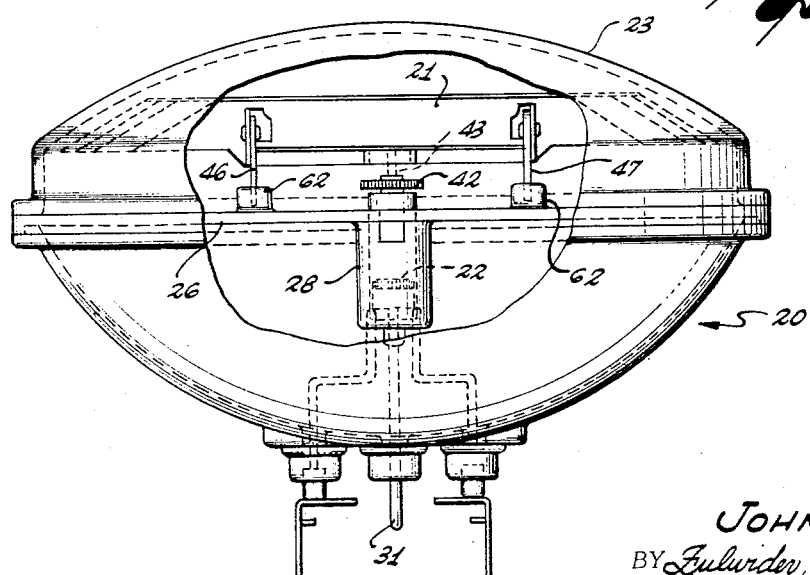
FIGURE 2 is a bottom plan view of the lamp of FIGURE 1, partly broken away to show the front and rear compartments of the lamp, with the rear compartment being hermetically sealed, and with all of the movable parts being located in the front compartment and supported on a transparent mounting plate.

Referring to FIGURES 1–3, there is shown an automobile headlamp 20 in accordance with my invention which contains a plurality of horizontal louvers 21 which are located between the filament 22 and the front lens 23. In accordance with my invention, the louvers 21 are adapted to be moved to and from a fully open position, i.e., horizontal, at such a frequency or rate that the beam of light emitted appears to be uninterrupted. The lamp is adapted to emit only the so-called "high beam," but due to the periodic diminishing of the emitted light, the total light power emitted is considerably less than that of an uninterrupted beam, and is at such a level that the objectionable glare presented by an uninterrupted beam is removed.

I have discovered that by rhythmically interrupting the light with such louvers, at a rate such that the light appears uninterrupted, the emitted beam is made to appear as a soft or buffered light, which is devoid of the glare of high illumination, but which allows the benefit of high illumination.

With reference to FIGURES 2 and 3, the lens 23 is separated from the reflector 25 of the lamp housing by a transparent glass plate 26. As best seen with reference to FIGURE 3, the transparent plate 26 and the reflector 25 are shaped adjacent their peripheries for interlocking engagement, and are bonded together by conventional glass bonding techniques. In addition to bonding the transparent plate 26 to the reflector 25, the chamber or compartment 27 defined by these elements is evacuated and filled with gas as desired.

Again referring to FIGURE 3, and also to FIGURES 5 and 6, the transparent plate 26 is formed with a small, hollow protuberance 28 which extends into the compartment 27. Extending through the back wall of the protuberance 28, and bonded thereto, are a pair of ceramic supports 30 through which wire leads 31 extend into the well 29 in the protuberance. At their opposite ends, the short leads 31 extend through another ceramic support 32.

In assembling the transparent plate 26 and the reflector 25, the ceramic support 32 is located in an opening in and bonded to the back wall of the reflector 25, in the same manner as the conventional ceramic supports for the leads of the filament 22.

Again referring to FIGURE 3, the well 29 is shaped to receive a motor 35, which is held in place by means of a spring clip 36. When the motor 35 with the spring clip 36 around it is inserted into the well 29, electrical terminal receptacles (not shown) in the motor housing are forced over the springs or inner ends of the wire elements 31. When the reflector 25 is positioned in place on the automobile so as to cause the filament 22 to be heated when the lighting switch is turned on, the external or plug ends of the wire connections 31 are simultaneously connected to a power source for setting the motor 35 into operation. Schematically, electrical connections for the filament 22 and the motor 35 to a power source are illustrated in FIGURE 3 as being connected through respective switches 38, 39 in which the movable contacts are mechanically connected to a dashboard control knob 40 for opening and closing the switches simultaneously.

The shaft of the motor 35 carries a pinion 41 on the outer end thereof. The pinion 41 is in meshing engagement with a large gear 42 which is supported for rotation on a bracket secured to the motor housing. As best seen in FIGURES 1 and 3, the gear 42 carries an off-center pin 43 on its outer face. Thus, when the motor 35 is in operation, the pin 43 rotates in a circle.

The transparent plate 26 is a mounting plate for the louver construction as well as the motor 35. The louvers 21 are secured to parallel vertical bars 46, 47 (see FIGURES 8 and 9 along with FIGURES 1–4 and 7) which have horizontal end portions terminating in the transparent plate 26, and the vertical rails 48, 49 of a pulsating frame 50. The end portions of both support bars 46, 47 are horizontal and terminate in the transparent plate 26, and the frame 50 has a horizontal bar 51 adjacent its lower end which has an opening 52 in an enlarged center portion 53 thereof into which the pin 43 of the gear 42 extends.

With this arrangement, as the gear 42 and pin 43 rotate, the frame 50 moves up and down and the louvers 21 are made to pivot on the support bars 46, 47.

As is apparent, any suitable means may be employed for attaching the louvers 21 to the support bars 46, 47 and the rails 48, 49 to permit the desired movement of the frame 50 and pivotal movement of the louvers. Preferably, the number, construction and arrangement of parts are such as to permit their formation and assembly at little cost in time, materials and labor. In the form of the invention illustrated, the louvers are designed to be formed and provided with integral tabs to be riveted to the support bars and the rails in a single stamping and forming procedure.

Referring to FIGURE 10, each louver 21 is formed from a rigid, rectangular sheet element, e.g., stainless steel, indicated in phantom at 56, which is somewhat wider than the louver to be made. The sheet 56 is stamped to form an element in the shape of a trapezoid, with small integral tabs 57, 58 extending from the longer of the parallel sides. Additionally, tabs 59, 60 are struck from the sheet 56 to extend at right angles to the face of the sheet, whereby spaced openings 59' and 60' are formed in the face of the sheet. Also, the tabs 57, 58 are bent toward the side of the sheet from which the struck tabs 59, 60 extend, and the ends of the tabs 57, 58 are bent at right angles so as to lie in the planes of the struck tabs 59, 60. Still further, all of the tabs 57–60 when formed are punched to provide holes for receiving connecting pins or rivets. As best seen in FIGURE 11, the confronting edge portions of the coplanar portions of the tabs 57, 59 are so formed that the upper tab 57 is rounded and nests in a fillet in the lower tab 59.

The louvers 21 are assembled on the support rods 46, 47 by locating the openings 59', 60' over the support bars 46, 47 and passing the louvers along these bars to the positions in which they are to be connected to the bars 46, 47 and rails 48, 49. For each louver, its lower tabs 59, 60 are pivotally connected by rivets to the support bars 46, 47, and the upper tabs 57, 58 are pivotally connected by rivets to the rails 48, 49 of the frame 50.

After the louvers 21, the support bars 46, 47, and the frame 50 are assembled as above described, they are mounted in place simply by inserting the ends of the support bars 46, 47 into snug fitting sockets provided in integral projections 62 formed in the front surface of the transparent plate 26. When the support bars 46, 47 are thus being positioned, the opening 52 in the bar 51 of the frame 50 slips over the pin 43 of the gear 42.

After the louver assembly is in place, the system can be tested for operation before securing the lens 23 to the transparent plate 26. In the lowermost position of the pin 43, and hence the frame 50, the louvers 21 are in a horizontal position, as indicated in dotted lines in FIGURE 4. In the uppermost position of the pin 43, the louvers 21 are depressed at an angle below the horizontal, e.g., 45 degrees, such that there is still sufficient light passing through the transparent plate 26 from the reflector 25 to permit the driver of the automobile to see a short distance in front of him. Thus, if for some reason the motor 35 ceases to operate when the frame 50 is in the uppermost position, the driver will not be without sufficient light for driving purposes.

Preferably, the parts are so shaped that the frame 50 needs to undergo only a very short stroke in moving the louvers from their semi-closed position to the fully open position. To aid in this respect, I have formed the support bars 46, 47 with rounded projections 65 on their rear edges, and formed the rails 48, 49 of the frame 50 with rounded projections 66 on their forward edges (see FIGURES 4, 8 and 9). At the time the support bars and the frame are formed, rivet holes are punched in the rounded projections 65, 66. As will be apparent, the formation of the support bars and frame can be accomplished with a quick stamping and punching operation.

As best seen in FIGURE 4, the projections 66 in the uppermost position of the frame 50 are disposed slightly above and in near touching relation with the projections 65. Still further, there is a slightly overlapping relation between the projections, so that the distance between horizontal projections of their axes is less than the actual distance between their axes. With this arrangement, the frame 50 cannot move directly downward in causing the louver to move to a horizontal position, but must move slightly rearwardly during its downward movement. Such movement causes the louvers 21 to pivot on their support bars 46, 47, with a minimum total stroke for the frame 50. For example, in one construction I obtain full open position for the louvers with a total stroke of only three-eighths of an inch for the frame 50.

In securing the lens 23 in place, it is not necessary to employ the high heat required for bonding the transparent plate 26 to the reflector 25. In fact, it is preferable that such heat not be employed as it might tend to damage the motor 35. Still further, it is preferable to secure the lens in place so that whenever it is necessary or desired, it can be removed to permit the motor 35 and/or the louver assembly to be repaired and/or replaced. Thus, the lens 23 may be secured to the transparent plate 26 by any suitable mechanical ring clip, or the like, which permits such removal.

As previously indicated, the form of lamp construction of my invention, as illustrated in FIGURES 12–19, is one in which the louvers are rotatable. In this embodiment, the lamp 20' does not employ any movable frame, but rather is provided only with a single fixed frame 70 which supports the motor and all of the louvers. Through suitable drive connections, the louvers are caused to rotate in synchronism with the output shaft of the motor, and at a speed such as to cause the desired rhythmical interruption of the beam for removing objectionable glare.

In the embodiment of FIGURES 12–19, I show an arrangement of ten louvers 71–80, wherein five of the louvers, shown as alternate louvers 71, 73, 75, 77, 79 are adapted to be driven from one end of the motor output shaft 81, and wherein the remaining louvers 72, 74, 76, 78, 80 are adapted to be driven from the other end of the motor shaft 81.

To this end, the motor shaft 81 is supported at its ends for rotation in the frame 70, and respective gears 82, 83 are secured to the ends of the motor shaft. Looking at the left end of the motor shaft 81, the gear 82 meshes with a gear 84 on the louver 71, whereby to effect rotation of the louver 71 with the motor shaft 81. Rotation of the louver 71 imparts rotation to the louvers 73, 75, 77, 79 therewith by means of a toothed belt 85 (see FIGURE 13 along with FIGURE 12) which meshes with respective pulley wheels 86–90 on the louvers 71, 73, 75, 77, 79.

Looking at the right end of the motor shaft 81 in FIGURE 12, the gear 83 is in meshing engagement with a gear 91 on the louver 71, and this in turn meshes with a gear 92 on the louver 72. Thus, the louver 72 is caused to rotate in a direction opposite to that of the louver 71. Louvers 72, 74, 76, 78, 80 are arranged for rotation in the same direction by means of a belt 93 which is like the belt 85 and which engages respective pulley wheels on those louvers.

Although alternate louvers are made to rotate in opposite directions, nevertheless they are arranged so that they simultaneously reach the horizontal positions in which they are fully open, i.e., present minimum interference to light passing from the reflector 25' through the transparent plate 26' and the lens 23'.

FIGURES 15–19 show best how I form the louvers and the frame, and how the louvers are formed so that they can be rotatably mounted in the frame. In essence, the louvers are formed with integral gears, pulley teeth and bearing elements as needed. Preferably, this is done by plastic molding techniques, wherein each louver is molded as a plastic element having integral bearing elements and the requisite gears and pulley wheels.

Referring to FIGURE 14, the louver 71 is shown as a flat rectangular element with spaced gears 84, 91, a pulley wheel 86 immediately adjacent the gear 84, a cylindrical bearing element 95 adjacent the pulley wheel 86 at one end, and a cylindrical bearing element 96 adjacent the gear 91 at the other end of the louver. The bearing elements 95, 96 effectively constitute spacers between the main body of the louver and the end portions thereof, and the slots 97, 98 formed thereby are utilized to permit the louver to be rotatably supported in the frame, as will be more fully explained below.

Referring to FIGURES 16 and 17, the louvers 72, 73 are also formed with integral bearing elements 95, 96 in slots 97, 98, precisely as in the manner of the louver 71 of FIGURE 15. However, the louver 72 includes only the one gear 92, and a pulley wheel 99 is located between the gear 92 and the bearing element 96, and the louver 73 is formed with only the one pulley wheel 87 thereon located adjacent one bearing element 95.

It will be recognized that the remaining louvers 74–80 are formed precisely in the manner of the louver 73 of FIGURE 17, i.e., with only one pulley wheel and the bearing elements.

To provide a better understanding of how the motor shaft 81 and the louvers are supported for rotation by the frame 70, reference will be made to FIGURE 18, along with FIGURES 12 and 13. The frame 70 is formed as a split frame comprising two portions 100, 101 which, following assembly of the motor and louvers, are secured together at their upper and lower ends, as indicated at 102.

The innermost frame portion 101, i.e., the portion adjacent the transparent plate 26' is provided with integral tabs 103 adjacent its upper and lower ends, which are adapted to be secured, as at 104, to the transparent plate 26'. To this end, the transparent plate 26' is formed with integral projections 105 into which the fastening elements 104 extend for securing the frame to the transparent plate.

The frame portions 100, 101 are formed with semi-circular grooves along their lengths so that when they are assembled together, they form openings 107 for the ends of the motor shaft 81 and openings 108 for the bearing elements 95, 96 of the louvers. Before the outer frame portion 100 is secured in place, the ends of the shaft 81 and the bearing elements of the louvers 71–80 are located in the corresponding semi-circular grooves in the inner frame portion 101. With the outer frame portion 100 secured in place, the frame provides circular bearing surfaces for the motor shaft 81 and the bearing elements 95, 96 of the louvers. In this connection, it will be apparent that irrespective of how the frame is formed, or of what material, the walls of the openings 107, 108 are made to form smooth bearing surfaces for the motor shaft and the bearing elements of the louvers.

It will be appreciated that before securing the frame portions 100, 101 together, the louvers 71–80 and the motor 35' are arranged with the various gears in meshing engagement and with the belts 85, 93 encircling the pulley wheels which they are to turn. After the frame portions are locked together, the motor housing is secured to the frame, as indicated at 109, so as to hold it stationary while the shaft is rotating.

In the embodiment of FIGURES 12–19, the arrangement for making external connections to the motor is different from that shown in FIGURES 1–11. In this connection, and referring to FIGURES 12–14, the motor is different from that shown in FIGURES 1–11. In this connection, and referring to FIGURES 12–14, the motor leads 31' extend out of the upper portion of the lens 23', and along the back of the reflector 25', and they are connected at their ends (see FIGURE 14) to the electrical terminals for the filament 22'. Thus, the motor and filament circuits are connected in parallel to the same source of power. When the dashboard control knob is operated to turn the headlamps on, power for operating the motor 35' is supplied from the same source which heats the filament 22'.

In order to provide a space in the upper part of the lens 23' for the motor leads 31' to extend to the exterior of the headlamp, the lens 23' preferably is formed with a pair of parallel grooves for this purpose. Thus, when the lens 23' is located in position to be secured to the transparent plate 25', the motor leads 31' are positioned to insure that they are captured within the grooves of the lens 23'. Preferably, of course, the motor leads are insulated along their lengths, and the grooves in the lens 23' are dimensioned to engage the insulation with sufficient firmness to establish an effective seal against entry of moisture through the grooves to the interior of the compartment defined by the lens 23' and the transparent plate 26'. Also, the insulation provides a protective barrier against heat between the wires and the rear wall of the reflector 25'.

To further illustrate the results obtained with my invention, one arrangement which has been built and tested utilizes a set of ten louvers adapted for rotation across the beam of a 5¾ inch sealed beam headlamp. The louvers were rotated at speeds ranging up to 3400 r.p.m.

It was found that so long as the speed is sufficiently high that the eye could not perceive any flutter, the particular speed of rotation does not appreciably affect candlepower measurements made while the louvers were spinning. It was also found that the beam, as viewed through the spinning louvers, was soft or buffered but still allowed the benefit of high beam illumination.

From the foregoing, it will be apparent that the various structures shown and described herein are illustrative and that various modifications can be made without departing from the spirit and scope of my invention. Accordingly, I do not intend that my invention be limited, except as by the appended claims.

I claim:
1. A lamp structure comprising:
  a reflector;
  a transparent plate sealed to said reflector and defining therewith a first compartment, said transparent plate having a motor well opening into said second compartment;
  a lens bonded to said transparent plate and defining therewith a second compartment;
  a filament between said reflector and transparent plate;
  a motor mounted in said motor well;
  a first pair of parallel rods in fixed spaced relation to said transparent plate in said second compartment;
  a second pair of parallel rods between said first pair of rods and said transparent plate;
  means connecting each louver to both pairs of rods;
  means releasably holding said motor in said well;
  leads for said motor extending to the exterior of said housing;
  a bar connecting the rods of said second pair and having an opening therein;
  a rotary element having an integral offset pin extending into said opening; and
  means for effecting rotation of said rotary element from said motor, whereby said pin subjects said bar and second pair of rods to reciprocal movement.

2. A lamp structure comprising:
  a reflector;
  a transparent plate sealed to said reflector;
  a lens bonded to said transparent plate;
  a filament between said reflector and transparent plate;
  a plurality of parallel horizontal louvers between said lens and transparent plate;
  a rectangular frame, said louvers having spaced bearing elements disposed in and rotatable in the sides of said frame;
  a motor having a motor housing and a shaft extending out of the ends thereof, the ends of said shaft being rotatably supported in the sides of said frame, said motor being located above the uppermost louver;
  gears on said shaft adjacent the ends thereof;
  a pair of gears on the uppermost louver in mesh with corresponding gears on the shaft;
  a gear on the louver adjacent the uppermost louver in mesh with one of the gears on the uppermost louver;
  a single pulley wheel near one end of each louver adjacent the frame, the pulley wheels on adjacent louvers being on opposite sides of the frame;
  a belt encircling and drivingly engaging the pulley wheels on one side; and
  a second belt encircling and drivingly engaging the pulley wheels on the other side, said belts and pulley wheels having meshing teeth.

3. A lamp structure as defined in claim 2, wherein the ends of said filament are connected through said reflector to electric terminals; and means connecting electric leads between said terminals and said motor.

4. A lamp structure as defined in claim 2, wherein said frame is formed of two rectangular elements, each having spaced semi-circular grooves in both sides thereof, said rectangular elements being secured together so that the grooves therein are aligned and form cylindrical openings in the sides of the frame, the ends of the motor shaft being disposed for rotation in one pair of said cylindrical openings, and each louver having its bearing elements disposed for rotation in respective pairs of said cylindrical openings.

5. A lamp structure as defined in claim 4, wherein one rectangular element of the frame is secured to the transparent plate.

6. A lamp structure as defined in claim 2, wherein the uppermost louver and the bearing elements, gears and pulley wheel thereon are plastic and molded together, the second uppermost louver and the bearing elements, gear and pulley wheel thereon are plastic and molded together, and each remaining louver and the bearing elements and pulley wheel thereon are plastic and molded together.

7. A lamp structure comprising:
  a reflector and a transparent glass plate heat-sealed at their peripheries and defining a first compartment;
  a lens engaging said transparent plate and defining therewith a second compartment;
  a filament in said first compartment adapted to be heated to cause said reflector to form a beam of light to pass through said transparent plate and said lens;
  a row of parallel louvers in said second compartment;
  means in said second compartment supporting said louvers for rotational movement in unison, said supporting means including parallel rods supported at their ends by said transparent plate, said louvers extending between and being rotationally supported at their ends by said rods;
  means in said second compartment for rotationally moving said louvers through positions parallel to the axis of the beam of light at a rate such that the beam of light passing through the lens appears uninterrupted;
  and securing means for holding said lens in engagement with said transparent plate, said securing means being characterized in that it is applied to the lens and the plate without heat.

8. A lamp structure comprising:
  a reflector and a transparent glass plate heat-sealed at their peripheries and defining a first compartment;
  a lens engaging said transparent plate and defining therewith a second compartment;
  a filament in said first compartment adapted to be heated to cause said reflector to form a beam of light to pass through said transparent plate and said lens;
  a row of parallel louvers in said second compartment;
  means in said second compartment supporting said louvers for rotational movement in unison, said supporting means including parallel rods supported at their ends by said transparent plate, said louvers extending between and being rotationally supported at their ends by said rods;
  means for rotationally moving said louvers through positions parallel to the axis of the beam of light at a rate such that the beam of light passing through the lens appears uninterrupted, said moving means including a motor in said second compartment;
  means operable by said motor to rotate the louvers so that adjacent louvers rotate in opposite directions;

and securing means for holding said lens in engagement with said transparent plate, said securing means being characterized in that it is applied to the lens and the plate without heat.

References Cited

UNITED STATES PATENTS

| | | | |
|---|---|---|---|
| 2,541,834 | 2/1951 | Robinson | 240—46.11 |
| 3,032,646 | 5/1962 | Chieger | 240—46.59 X |
| 3,034,029 | 5/1962 | Logan | 240—46.11 X |
| 3,049,962 | 8/1962 | Denecke | 240—46.07 X |
| 3,275,820 | 9/1966 | Szarkowski | 240—46.11 X |

FOREIGN PATENTS 1,083,812  6/1954  France.

NORTON ANSHER, *Primary Examiner.*

CHARLES C. LOGAN II, C. R. RHODES,
*Assistant Examiners.*